Figure 1:
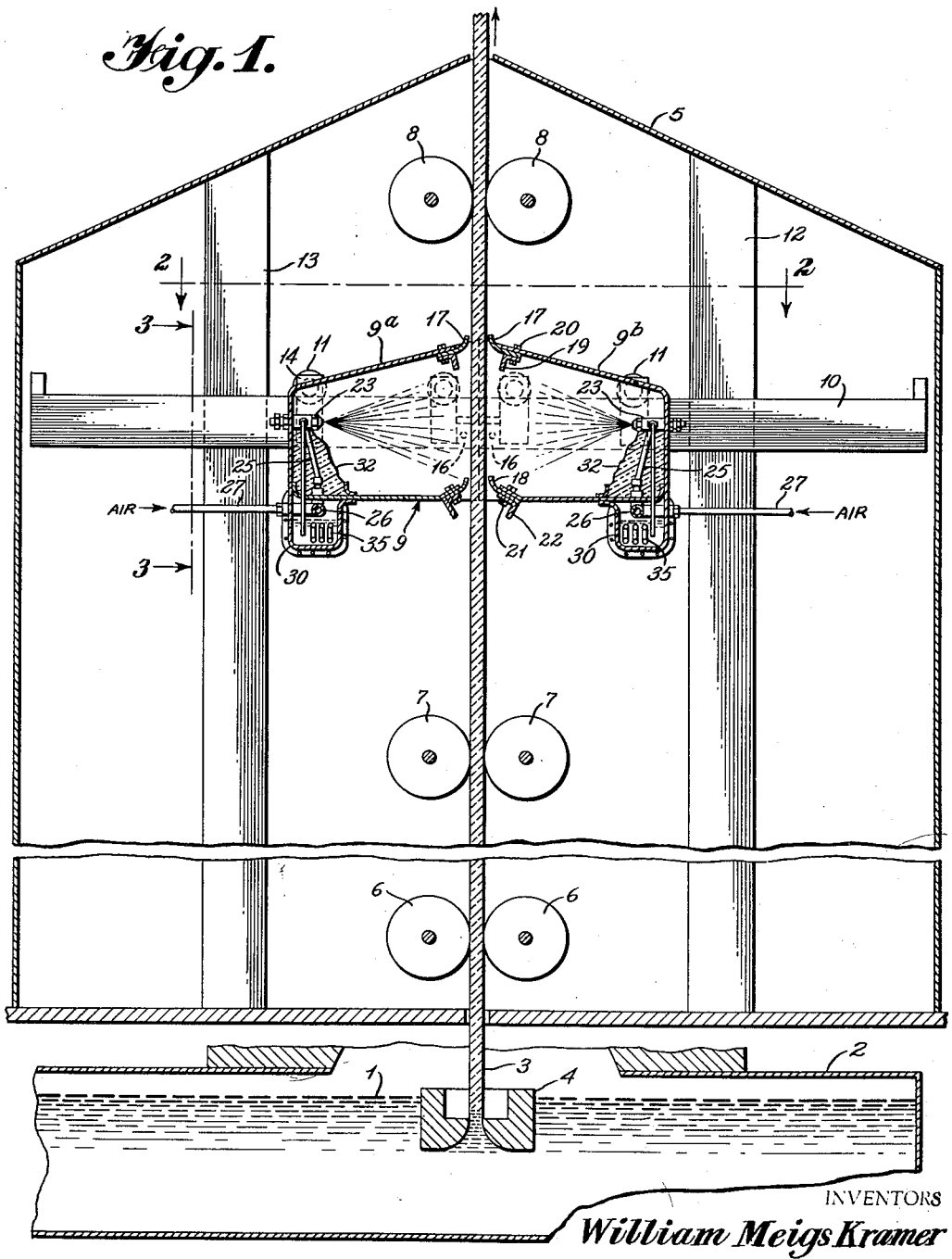

April 20, 1954     W. M. KRAMER ET AL     2,675,646
CONTINUOUS SHEET GLASS DRAWING AND COATING APPARATUS
Filed Oct. 22, 1952     3 Sheets-Sheet 1

INVENTORS
William Meigs Kramer
and Hugh J. Marsh
BY *Burns, Doane & Benedict*

ATTORNEYS

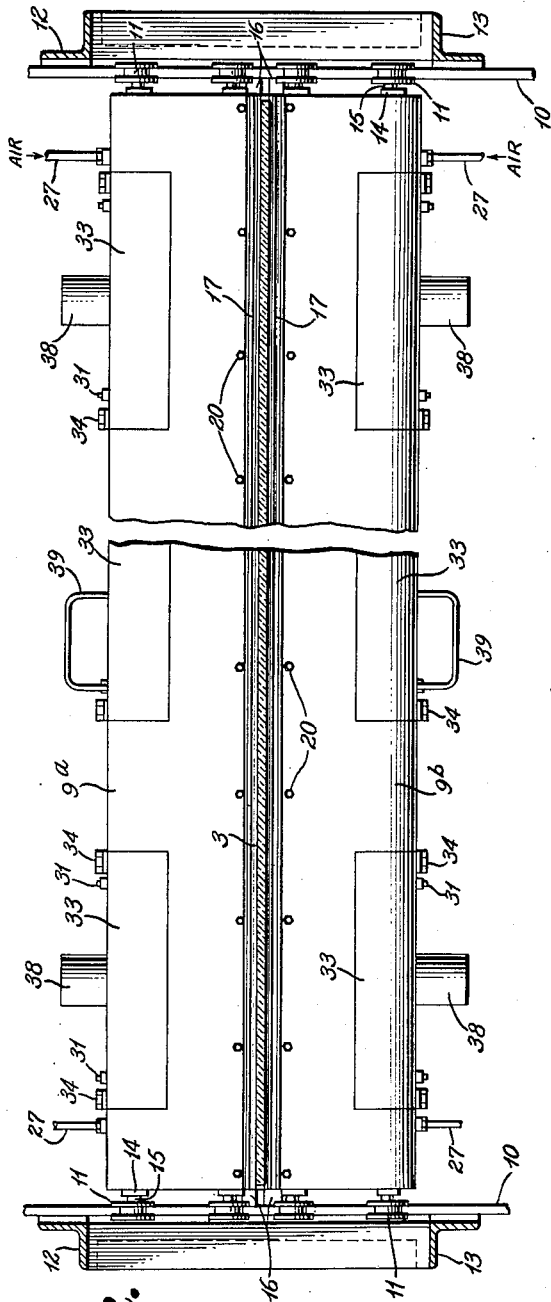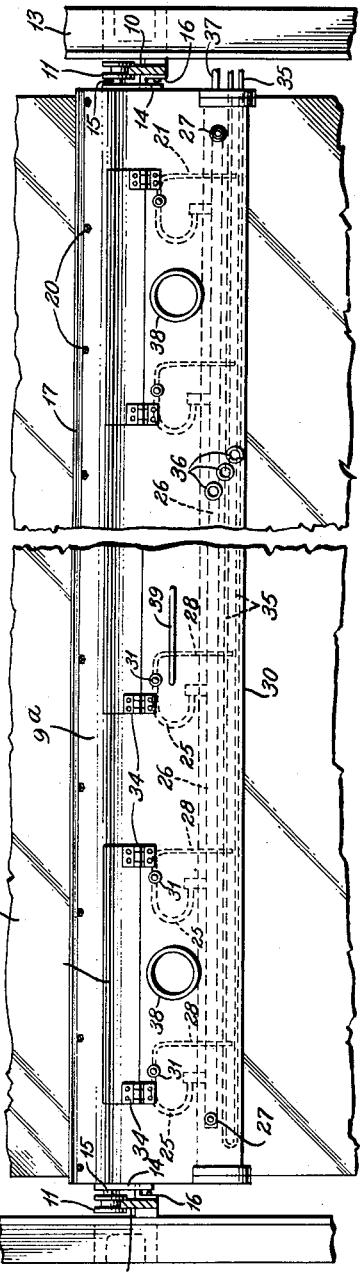

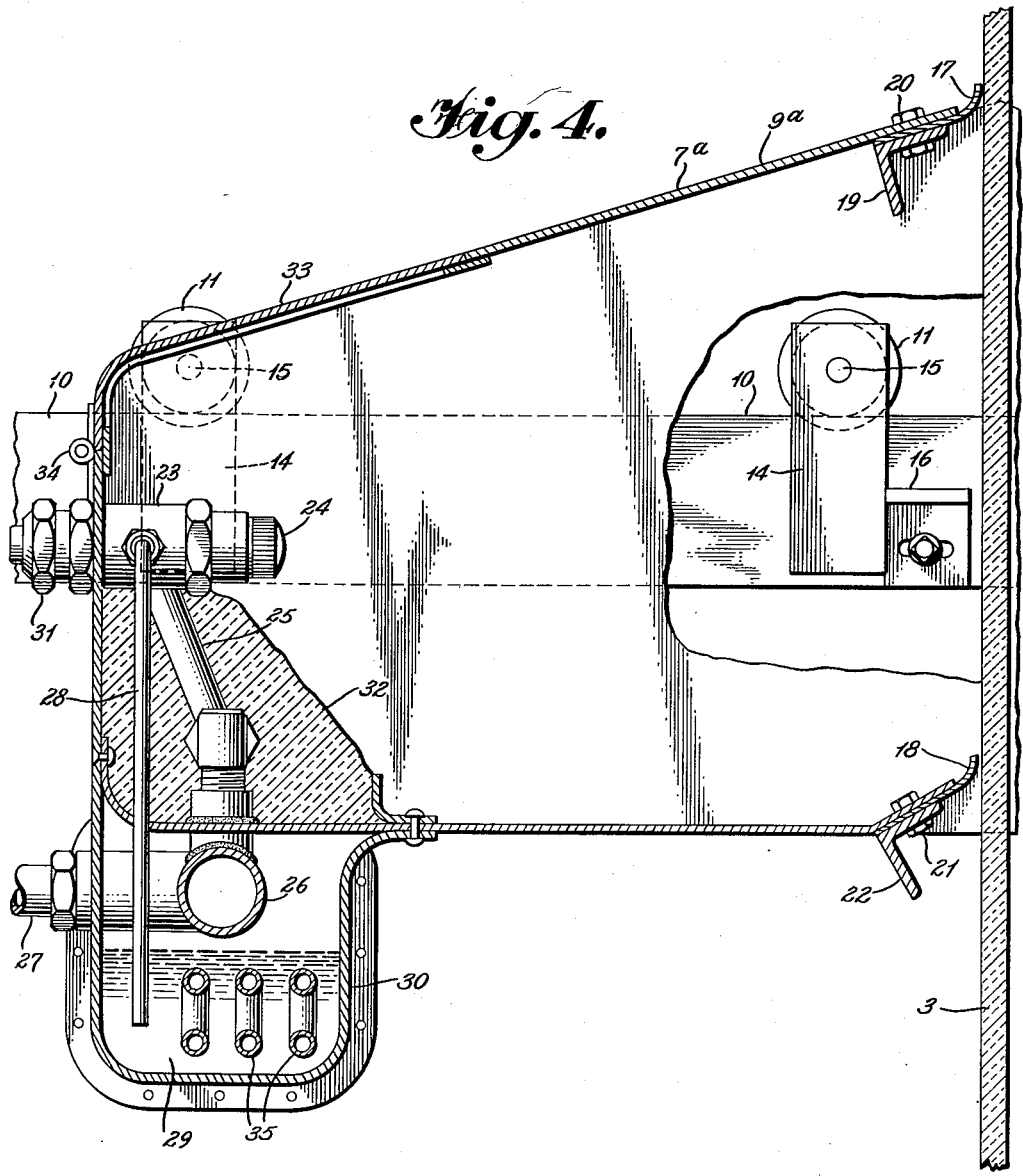

Patented Apr. 20, 1954

2,675,646

UNITED STATES PATENT OFFICE 2,675,646

CONTINUOUS SHEET GLASS DRAWING AND COATING APPARATUS

William M. Kramer and Hugh J. Marsh, Clarksburg, W. Va., assignors to Adamston Flat Glass Company, Clarksburg, W. Va.

Application October 22, 1952, Serial No. 316,252

4 Claims. (Cl. 49—1)

This invention relates to an apparatus for continuously drawing sheet glass. More particularly, the invention relates to an apparatus for continuously drawing sheet glass which has improved surface stability in storage.

Sheets of conventional glass, when stored in mutual contact under normal atmospheric conditions, undergo surface degradation in the contact area. Under average conditions of storage, such degradation so adversely affects the transparency and surface properties of the sheet glass as to render the sheet unfit for use in the conventional manner. In extreme cases, sheets of glass stored in direct, mutual contact may actually fuse together.

Prior to this invention, sheet glass producers have sought to obviate this degradation phenomenon by interleaving glass sheets with materials intended to preclude the mutual contact of the surfaces of the sheets. In the early days of the industry, straw and hay were used for this purpose. More recently, various types of paper, wood flour, and similar materials have been so employed.

These expedients of the prior art are not entirely satisfactory. The interleaving material utilized must be stable under the conditions to which the sheet glass may be subjected in storage and transportation. Additionally, it has been found impractical in the industry to interleave strip glass of certain sizes and as a consequence mutually contacting surfaces of such strip glass have been exposed to the degradation hazard during storage and shipping. Further, besides the impracticality of interleaving the glass preparatory to storage or shipping, it is obvious that this interleaving procedure is expensive and time consuming in quantity glass production. Accordingly, the expedient of producing glass which need not be interleaved is of considerable importance in the sheet glass producing field.

Where the sheet glass is drawn as a continuous ribbon from a mass of molten glass the interleaving operation is collateral to the primary sheet glass drawing and must be accomplished manually. It is obvious that a continuous sheet glass drawing apparatus capable of producing glass which is not appreciably subject to surface degradation upon mutual contact of the glass would eliminate the expensive interleaving operation and hence significantly advance the frontiers of the science of sheet glass manufacture.

A primary object of this invention is to provide an apparatus for continuously drawing a glass sheet which may be stored without appreciable surface degradation in direct, mutual contact with other glass sheets in the absence of conventional interleaving material.

A further object of the invention is to provide a unitary apparatus for producing a continuous glass sheet having a coating on the surfaces thereof which obviates the necessity of interleaving the glass and which may remain on the glass when utilized for conventional purposes.

It is a further object of this invention to provide a continuous sheet glass drawing apparatus wherein the heat from the drawn continuous sheet is utilized in the formation of a polysiloxane film on the glass surface during its passage through an atmosphere containing an organosilicon solution.

Generally, the apparatus of this invention comprises means for initiating the drawing of a continuous glass sheet from a molten mass of glass, a plurality of spaced pairs of roller means to move the continuously drawn sheet away from the molten mass, a coating chamber intermediate two of said pairs of rollers, and means for providing within said coating chamber an atmosphere of a coating composition. The heat of the drawn glass sheet at the position of the coating chamber coacts with the atmosphere within the chamber to form a thin protective coating on the glass surfaces. The glass sheet passes upwardly from the coating chamber between the remaining pairs of drawing rollers, where it is suitably cooled so that it may be cut up or handled in any of the conventional or well known manners.

A specific embodiment of the invention is illustrated in the accompanying drawings, in which Figure 1 is a transverse, sectional view illustrating a preferred embodiment of the glass drawing apparatus, Figure 2 is a top plan view taken on line 2—2 of Figure 1 with the drawn glass sheet shown in section, Figure 3 is a side elevation of the coating chamber taken on line 3—3 of Figure 1, and Figure 4 is an enlarged, sectional view illustrating one side of the coating chamber of Figure 1.

Referring particularly to Figure 1, which illustrates the over-all glass drawing apparatus, 1 designates a mass of molten glass which is maintained in a molten state in a suitable furnace tank 2. A continuous glass sheet 3 is drawn upwardly from this mass of molten glass through a drawing block 4. This sheet of drawn glass 3 passes upwardly through an opening in the base of the roller and coating housing 5.

The sheet of glass passing upwardly through the apparatus moves between pairs of spaced rollers 6, 7, and 8. It is pointed out that, whereas the drawings for simplicity illustrate only six such rollers, in actual practice a multiplicity of pairs of rollers are positioned adjacent the surfaces of the glass sheet to serve in drawing and forming the glass as it passes upwardly through the apparatus. By the time the glass sheet 3 has passed the pair of rollers 7 located below the coating housing 9, the once molten glass has cooled to a point where it is set up and no longer is in a molten or plastic state. Preferably, the temperature of this glass as it enters the opening between the halves of the coating chamber is between 100° F. and 400° F.

The coating chamber designated generally by the reference numeral 9 consists of two housings 9a and 9b adjacent opposite sides of the sheet of glass. These housings of the coating chamber are supported at their opposite ends on rails 10 as shown more clearly in Figures 2 and 3. To the ends of the housings 9a and 9b are attached rollers 11 which engage the horizontal rails 10. As shown in Figure 1, rails 10 are bolted to the vertically extending reinforcing angle irons 12 and 13 of the roller and coating housing 5.

By providing this construction for mounting the housings of the coating chamber, these housings may be readily moved away from their normal position adjacent the surfaces of the sheet of glass 3. With the housings 9a and 9b rolled back away from their operative position as shown on Figures 1, 2, and 3, initiating the glass drawing and cleaning or adjusting the apparatus within the housings may be readily accomplished.

As shown on Figures 2 and 3 of the drawings, the rollers 11 are supported on the ends of the coating housings by support plates 14 attached to the ends of the housings. These plates 14 support the axles 15 for the rollers 11. In addition to their function in supporting the rollers 11, the adjacent plates 14 of housings 9a and 9b act as limit stops in the movement of the housings towards each other. In this respect, spacing brackets 16 are bolted to the rails 10 opposite the edges of the moving sheet glass. The spacing brackets 16 may suitably be made adjustable to vary the spacing between the housing 9a and 9b when they are moved to their closest position with respect to the drawn sheet glass. As shown on the drawings, spacing brackets 16 are positioned so as to prevent the edges of the coating housings from moving inwardly to contact the surface of the drawn glass sheet. However, it has been found that the edges of the coating housings may lightly touch the drawn glass sheet without creating any appreciable detrimental effects on the coating applied to the glass sheet.

Referring more particularly to the specific construction of the coating chamber 9, reference is made to Figure 4, which illustrates an enlarged sectional view of housing 9a. At the edge of the housing adjacent the surface of the glass sheet 3, curved members 17 and 18 are bolted lengthwise along the edge of the housing. In the case of the upper member 17, a reinforcing angle member 19 is bolted by a nut and bolt 20 to the edge of the housing. Likewise, the member 18 at the lower edge of the housing is bolted to the edge by a nut and bolt 21, together with a reinforcing angle iron 22. These longitudinally extending angle irons 19 and 22 serve to reinforce the edges of the top and bottom of the coating housing adjacent the surface of the glass. Without these angle irons 19 and 22, the long edges of the open side of the housing 9a and 9b would have a tendency to sag and thus prevent the housing from being moved close to the surface of the glass sheet being drawn without a portion of the edge contacting the surface. Accordingly, it is important that the edge of members 17 and 18 which is adjacent the glass surface be substantially straight so that it will be parallel to the surface of the glass sheet. It is desirable that neither member 17 nor member 18 contact the surface of the glass sheet 3, despite the fact that at this stage in the drawing apparatus the glass sheet has set up. It has been found, however, that a light contacting of the glass surface is not objectionable as long as the edges 17 and 18 do not bear heavily against the surface so as to adversely affect the thin coating being formed on the sheet glass.

Mounted in the wall of the housing 9a opposite the surface of the moving sheet of glass, are a plurality of aspirating type sprayers 23. These sprayers have nozzles 24 from which is expelled a liquid spray of a solution of an organosilicon compound, which creates an atmosphere within the housing 9a for coating the glass surface as it passes the open side of the housing.

Each sprayer 23 is of the well-known aspirating type wherein gas under pressure, such as air, is used to aspirate and atomize a liquid drawn from a supply chamber. The atomizing air is supplied to each sprayer through conduit 25. This conduit in turn communicates with a common header 26 supplying air to all the sprayers in the housing and extends lengthwise through the housing 9a as shown in Figures 2 and 3.

This header 26 is connected with a flexible air line 27 at opposite ends of the housing. The liquid for these sprayers 23 is drawn through a pipe 28 for each sprayer which communicates with the body of liquid 29 retained beneath the coating housing in a chamber 30 which extends across the bottom of the coating housing. Adjustment of the character of the spray from the nozzle 24 is possible by adjustment of the nut 31 on the outer end of the sprayer 23.

When the compressed air is led to the sprayer through the flexible conduit 27, header 26, and conduit 25, the air passing through the sprayer draws the liquid 29 from chamber 30 through pipe 28 and sprays it in atomized form from nozzle 24.

The surface of the glass 3 is at a relatively high temperature with respect to the organosilicon compound and solvent in chamber 30. Thus, the air conduit 25 and pipe 28 may be appropriately protected by a heat insulating material 32, for example, vermiculite. Possible vapor lock in the aspirating tube 28 is thereby prevented.

In addition to the mobility of the coating housings on the rails 10, thus providing easy access to the interior of the housing, access doors 33 are provided and hinged as at 34 at appropriate positions along the length of the coating housing.

To prevent the liquid within the chamber 30 from becoming unduly heated by the temperature within the glass drawing apparatus, cooling coils 35 are provided within the chamber 30. A cooling liquid may be circulated through these cooling coils 35 to maintain the temperature of the liquid 29 below a temperature which might cause decomposition of the organosilicon compounds and the solvent in the coating liquid.

As shown in Figure 3, sight glasses 36 are provided at a plurality of levels in the side of the chamber 30. These sight glasses facilitate inspection of the liquid level maintained within the chamber 30. The liquid to be sprayed into housings 9a and 9b may be supplied to supply chamber 30 through conduits 37 shown in Figure 3.

The outlet conduits 38 shown in Figures 2 and 3 communicate with the interior of the coating chamber and are connected to a suitable solvent recovery system, not shown.

Handles 39 on the sides of the coating housings 9a and 9b, shown more clearly in Figures 2 and 3, are provided to enable movement of the coating housing away from the surfaces of the drawn glass sheet.

As illustrated in Figure 1, upon leaving the area of the coating housing, the sheet glass 3 passes upwardly between the final pairs of guide rolls 8. After passing through the opening in the top of the roller and coating housing 5, the drawn glass sheet may be cut and handled in any conventional and well-known manner.

The operation of the embodiment of the invention disclosed in the drawings is as follows: A sheet of glass is drawn upwardly from the mass of molten glass 1 and passes between the multiplicity of pairs of rollers indicated by way of example at 6, 7, and 8 on Figure 1. During the passage of the glass sheet between the pairs of rollers, it is gradually cooled so that it becomes set up and no longer is in the molten or plastic state. In passing upwardly through the glass drawing apparatus, the glass sheet passes through coating chamber 9. This chamber, which consists of the two housings 9a and 9b, exposes the opposite surfaces of the glass sheet to an atmosphere of suitable organosilicon coating composition. The heat remaining within the sheet glass as it passes through the coating chamber causes the coating solution within the atmosphere of the chamber to form a polysiloxane film on the surface of the sheet glass.

It has been found in actual practice that it is desirable for the drawn glass sheet to have cooled to a temperature of between 100° F. and 400° F. before it enters the coating chamber 7. If the temperature is below this limit the polysiloxane film will not be properly formed due to lack of sufficient heat for coaction between the organosilicon compound and the glass surface. Likewise a temperature above 400° F. will cause the organosilicon compound to decompose and thereby prevent the formation of the polysiloxane film on the sheet glass.

The atmosphere within the coating chamber 9 is created by the sprayers 23, which aspirate the coating solution from the supply chamber 30 and spray it into the respective housings 9a and 9b. In order to obtain a more uniform and thin coating on the surfaces of the glass, it has been found advisable to so position the sprayers 23 with respect to the surface of the glass sheet that the spray therefrom will not directly impinge on the surface of the glass sheet. Accordingly, it is important that the coating solution be formed into a mist of finely divided liquid particles by the sprayers 23. This mist creates the atmosphere of coating solution through which the glass sheet passes. The hot glass sheet, in passing through this atmosphere containing the finely divided liquid particles of coating solution, acts therewith to form the desired extremely thin, uniform and adherent film on the glass sheet.

After moving through the coating chamber 9, the drawn glass sheet continues upwardly through the remaining pairs of drawing rollers shown for example at 8 in Figure 1. The glass sheet thus becomes finally cooled and is now in condition to be cut up into lights or handled in other suitable and well known methods.

The preferred method of operation comprises drawing a continuous glass sheet from a mass of molten glass, cooling this sheet to a temperature of about 100° F. to 400° F., passing the cooled sheet through an atmosphere containing at least about 1,000 p. p. m. by volume of a solution in a chlorinated hydrocarbon solvent of an organosilicon compound to produce a polysiloxane film on the surface of said continuous glass sheet and thereafter cutting said continuous sheet into sheets of desired size. This solution preferably contains about 0.02 to about 2.0% by weight of said organosilicon compound. Also, the period of residence of a point on said continuous sheet within said atmosphere is from about 2 to about 120 seconds. For a more detailed description of a suitable method in which the present apparatus may be utilized, reference may be had to copending application Serial Number 257,766, filed November 23, 1951, which issued as Patent Number 2,630,656, March 10, 1953.

Having thus described our invention what we claim is:

1. A continuous sheet glass drawing apparatus comprising a plurality of spaced pairs of drawing rolls for forming a continuous sheet of glass from a mass of molten glass, a coating chamber positioned intermediate two of said pairs of rolls and extending parallel to said drawing rolls, said coating chamber including horizontally relatively movable housings having opposed open sides between which the continuous sheet glass is drawn, and sprayers in said housings to create an atmosphere of coating material therein.

2. An apparatus as recited in claim 1 wherein the mounting for said housings comprises rollers rotatably secured to the ends of said housings and guide rails operatively supported so as to cooperate with said rollers and permit relative movement between the coating housings in a horizontal plane.

3. A continuous sheet glass drawing apparatus comprising a plurality of spaced pairs of drawing rolls for forming a continuous sheet of glass from a mass of molten glass, a coating housing intermediate two of said pairs of drawing rolls parallel to said drawing rolls and having an opening in one wall thereof, sprayers spaced along the length of said housing for creating a coating atmosphere in said housing, said housing being positioned with respect to the continuous sheet of glass with the opening therein facing the surface of the drawn sheet of glass.

4. A continuous sheet glass drawing apparatus comprising spaced pairs of drawing rolls for forming a continuous sheet of glass from a mass of molten glass, a pair of elongated coating housings parallel to said drawing rolls and positioned intermediate two of said pairs of rolls, rollers mounted on the ends of said housings, guide rails supported transversely of the drawn glass sheet at each edge thereof, said rollers cooperating with said rails to permit relative movement between said housings away from and toward the glass sheet being drawn, adjustable stop means for limiting the movement of said housings toward the glass sheet being drawn, and sprayers mounted at spaced positions along the length of said housings to create a coating atmosphere within said housings.

References Cited in the file of this patent

UNITED STATES PATENTS

| Number | Name | Date |
| --- | --- | --- |
| 2,068,746 | Hinsey | Jan. 26, 1937 |
| 2,235,978 | Braucher | Mar. 25, 1941 |
| 2,428,307 | Carlton | Sept. 30, 1947 |
| 2,491,889 | Beunett et al. | Dec. 20, 1949 |

FOREIGN PATENTS

| Number | Country | Date |
| --- | --- | --- |
| 595,452 | Germany | Apr. 11, 1934 |